US006408062B1

(12) United States Patent
Cave

(10) Patent No.: US 6,408,062 B1
(45) Date of Patent: Jun. 18, 2002

(54) PRE-QUALIFYING CALL-BACK SERVICE

(75) Inventor: Ellis K. Cave, Plano, TX (US)

(73) Assignee: InterVoice Limited Partnership, Reno, NV (US)

( * ) Notice: Subject to any disclaimer, the term of this patent is extended or adjusted under 35 U.S.C. 154(b) by 0 days.

(21) Appl. No.: 09/443,626

(22) Filed: Nov. 19, 1999

(51) Int. Cl.[7] .......................... H04M 3/42; H04M 3/48
(52) U.S. Cl. .................. 379/210.01; 379/900
(58) Field of Search ....................... 379/209.01, 210.01, 379/900

(56) References Cited

U.S. PATENT DOCUMENTS 5,661,790 A    8/1997  Hsu ..................... 379/209.01
5,987,112 A   11/1999  Chakravarti et al. ... 379/209.01

FOREIGN PATENT DOCUMENTS

| WO | WO 92 01350 | * | 1/1992 | ............ H04M/3/42 |
| WO | WO 97 19548 A | | 5/1997 | ............ H04M/15/00 |
| WO | WO 97 24860 A | | 7/1997 | ............ H04M/3/48 |

OTHER PUBLICATIONS

PCT International Search Report (PCT/US00/31339) dated Apr. 5, 2001.

* cited by examiner

Primary Examiner—Harry S. Hong
(74) Attorney, Agent, or Firm—Fulbright & Jaworski L.L.P.

(57) ABSTRACT

A system and method for administering Call Back service are disclosed which are capable of pre-qualifying such Call Back service. Such a system and method are capable of pre-qualifying a request for a Call Back service before returning a call back to the requesting customer. In this manner, the customer may not begin being charged at the lower call rate until after a connection is first established with the called number. A call back server may attempt to connect the customer requesting Call Back service with the called party by first attempting to establish a connection with the called party. Once a connection is established with the called party, the call back server may call the customer and connect the called party to the customer. In this manner, the customer may only be charged for a call back from the call back server if a connection is first established with the called number.

30 Claims, 3 Drawing Sheets

```
HISTORY OF CALL BACK SERVICE REQUESTS FOR JOE CUSTOMER

1. CALL BACK SERVICE TO CALLED NUMBER: (555) 555-1111
   SERVICE REQUESTED 5/1/99, 1:30 PM
   RESULT: NO ANSWER
   RESULT OBTAINED 5/1/99, 1:35 PM

2. CALL BACK SERVICE TO CALLED NUMBER: (555) 555-2222
   SERVICE REQUESTED 5/2/99, 3:20 PM
   RESULT: LINE BUSY
   RESULT OBTAINED 5/2/99, 3:28 PM

3. CALL BACK SERVICE TO CALLED NUMBER: (555) 555-3333
   SERVICE REQUESTED 5/3/99, 10:30 AM
   RESULT: ERROR, NUMBER IS NO LONGER IN OPERATION
   RESULT OBTAINED 5/3/99, 10:32 AM

4. CALL BACK SERVICE TO CALLED NUMBER: (555) 555-4444
   SERVICE REQUESTED 5/4/99, 5:01 PM
   RESULT: CALL ANSWERED BY ANSWERING DEVICE
   RESULT OBTAINED 5/4/99, 5:07 PM

5. CALL BACK SERVICE TO CALLED NUMBER: (555) 555-5555
   SERVICE REQUESTED 5/4/99, 5:30 PM
   RESULT: REQUESTED PERSON NOT AVAILABLE
   RESULT OBTAINED 5/4/99, 5:32 PM
```

HISTORY OF CALL BACK SERVICE REQUESTS FOR JOE CUSTOMER

1. CALL BACK SERVICE TO CALLED NUMBER: (555) 555-1111
   SERVICE REQUESTED 5/1/99, 1:30 PM
   RESULT: NO ANSWER
   RESULT OBTAINED 5/1/99, 1:35 PM

2. CALL BACK SERVICE TO CALLED NUMBER: (555) 555-2222
   SERVICE REQUESTED 5/2/99, 3:20 PM
   RESULT: LINE BUSY
   RESULT OBTAINED 5/2/99, 3:28 PM

3. CALL BACK SERVICE TO CALLED NUMBER: (555) 555-3333
   SERVICE REQUESTED 5/3/99, 10:30 AM
   RESULT: ERROR, NUMBER IS NO LONGER IN OPERATION
   RESULT OBTAINED 5/3/99, 10:32 AM

4. CALL BACK SERVICE TO CALLED NUMBER: (555) 555-4444
   SERVICE REQUESTED 5/4/99, 5:01 PM
   RESULT: CALL ANSWERED BY ANSWERING DEVICE
   RESULT OBTAINED 5/4/99, 5:07 PM

5. CALL BACK SERVICE TO CALLED NUMBER: (555) 555-5555
   SERVICE REQUESTED 5/4/99, 5:30 PM
   RESULT: REQUESTED PERSON NOT AVAILABLE
   RESULT OBTAINED 5/4/99, 5:32 PM

FIG. 7

PRE-QUALIFYING CALL-BACK SERVICE

RELATED APPLICATIONS

This application is related to concurrently filed and commonly assigned U.S. application Ser. No. 09/443,759 entitled "AUTONOMOUSLY ADMINISTERING ENHANCED TELEPHONY SERVICES" and concurrently filed and commonly assigned U.S. application Ser. No. 09/443,990 entitled "ADMINISTERING CALL BACK SERVICES," the disclosure of which applications are hereby incorporated herein by reference.

TECHNICAL FIELD

The invention relates in general to telecommunication systems, and in specific to administering Call Back services.

BACKGROUND

Because of the tariffs imposed by governments in many countries on telephone calls made outside the country, it is sometimes more expensive for a person located in a first country to call a person in a second country than it is for the person located in the second country to call the person in the first country. For example, if person X is in Brazil and wants to call person Y in the United States, the call may cost person X $1.50 per minute due to tariffs imposed by the Brazilian government. However, if person Y in the United States called person X in Brazil the call may only cost person Y $0.75 per minute. The difference in price for the two calls is generally due to caller X's home country (Brazil in this example) imposing higher tariffs on calls originating in that country.

Because of such difference in prices, a need arose for a system and method which would allow a person in a country with higher tariff rates to place a call to a person in a country with lower rates at the lower rate. That is, there exists a desire to have a method and system whereby person X could call person Y at the lower rate that person Y would be charged to place a call to person X (e.g., $0.75 in the above example).

An enhanced telephony service referred to as "Call Back" is currently being provided by enhanced telephony service providers, which allows callers from a country with high tariff rates to call persons in countries with lower rates at the lower rates. Utilizing the currently administered Call Back service for the above example, caller X would place a call to a service provider in the United States. The service provider would have a call back server in the United States that would answer caller X's call. Such a call back server would typically play a recording that would prompt caller X to enter the telephone number from which caller X is calling. Some call back servers would also prompt caller X to enter the United States telephone number that caller X wants to call. Caller X would use the touch-tone keys on the telephone keypad to enter his telephone number and person Y's telephone number if requested. Caller X would then hang up.

The above-described process of calling a service provider in the United States and entering the required telephone numbers typically takes under a minute. Therefore, caller X would typically be charged $1.50 for the first minute that it took to place the call from Brazil to the service provider in the United States.

Once the call back server receives the required telephone number(s), the server calls caller X back in Brazil. If the server has not already received the United States telephone number to be called from caller X, the server will request that number from caller X at this time. The server then places caller X on hold while the server attempts to connect the call to person Y in the United States. At this time, caller X is being charged the lower $0.75 per minute rate that it costs to call from the United States to Brazil. After a connection is made to person Y, caller X and person Y can talk with caller X being charged the lower United States rate of $0.75 per minute for the call. In this manner, the prior art Call Back service allows a caller from a country with a higher rate to place a call to a country with a lower rate at the lower rate.

SUMMARY OF THE INVENTION

Several problems exist with the prior art method and system for administering Call Back service. In the prior art method and system for administering Call Back service, a customer requesting Call Back service is called back before an attempt is made to connect to the called party. As the above-example for prior art Call Back service demonstrates, the prior art call back server calls caller X back before the call back server attempts to establish a connection with the called party Y. The customer requesting Call Back service (e.g., caller X) begins being charged at the lower calling rate once the call back server returns the customer's call. Thus, the customer is charged for the time required for attempting to establish a connection with the called party (e.g., called party Y). The customer is charged for such time required for attempting to make a connection with the called party even if a connection is ultimately not established with the called party.

Utilizing the above example, caller X requests Call Back service from a call back server. The call back server then places a call back to caller X, and once a connection is established with caller X, caller X begins being charged the lower $0.75 per minute rate. Thereafter, the call back server attempts to establish a connection with the called party Y. During the time that the call back server is attempting to establish such a connection with called party Y, caller X is charged at the lower $0.75 per minute rate. Thus, caller X begins being charged at the lower $0.75 per minute rate before a connection is actually established with called party Y in the United States. If there is ultimately not an answer at called party Y's telephone number, caller X is still charged $0.75 per minute for the time required for the call back server to attempt to establish a connection with person Y. Even though the charges accumulated during the time in which the call back server is attempting to establish a connection with the called party are typically low, such charges are costs that a customer would like to avoid.

In view of the above, there exists a desire for a method and system for pre-qualifying Call Back service wherein a customer requesting Call Back service is not charged for the time that the call back server is attempting to establish a connection with the called party. There is a desire for a method and system for pre-qualifying Call Back service wherein a customer does not begin being charged the less expensive rate before the call is connected to the called party. There is a further desire to provide a method and system for administering Call Back service wherein the caller does not get charged for calls that are not completed to the called party.

These and other objects, features and technical advantages are achieved by a system and method for administering Call Back service which are capable of pre-qualifying such Call Back service. Such a system and method are capable of pre-qualifying a request for a Call Back service before returning a call back to the requesting customer. In this manner, the customer may not begin being charged at the lower call rate until after a connection is first established with the called number.

In a preferred embodiment, the system and method for pre-qualifying Call Back services is implemented within a system and method for administering Call Back services as disclosed in co-pending U.S. application Ser. No. entitled "ADMINISTERING CALL BACK SERVICES." Such implementation may provide decreased cost and increased convenience to a customer requesting Call Back services. However, in alternative embodiments the system and method for pre-qualifying Call Back services disclosed herein may be implemented in other systems and methods for administering Call Back services, including those of the prior art. Any such implementation and embodiment is intended to be within the scope of the present invention.

In a preferred embodiment, an Enhanced Services Platform (hereinafter "ESP") provides enhanced telephony services offered by a service provider, including Call Back service. However, in alternative embodiments a call back server other than an ESP may be utilized to provide Call Back service, and any such embodiment is intended to be within the scope of the present invention.

In a preferred embodiment, the ESP (or "call back server") may attempt to connect the customer requesting Call Back service with the called party by first attempting to establish a connection with the called party. Once a connection is established with the called party, the ESP may call the customer and connect the called party to the customer. In this manner, the customer may only be charged for a call back from the ESP if a connection is first established with the called number.

The ESP may return a call back to the requesting customer in response to various types of connections established with a called number. For example, the ESP may call a requesting customer back if any type of connection is first established on the called number. For such an alternative, the ESP may return a call back to the requesting customer if any type of connection is established with the called number, including if a person other than a desired party answers the called party's telephone or if an answering device (e.g., an answering machine or voice mail) answers the called party's line. Alternatively, the ESP may call a requesting customer back only if a connection is first established with a person (i.e., a human being), rather than some type of answering device. For such an alternative, the ESP may return a call back to the requesting customer if any person answers the called party's telephone, but not if an answering device answers the called party's line. Alternatively, the ESP may call a requesting customer back only if a connection is established with a specific person.

In a preferred embodiment, the requesting customer may specify which situation or situations the ESP is to return a call back to the customer. For example, a requesting customer may specify that the ESP is to return a call back to the customer if any connection is established with the called number, only if a human being answers the called party's line, or only if a specific human being is available at the called party's line.

Additionally, the ESP may notify the requesting customer of the result of pre-qualifying the requested Call Back service. That is, the ESP may notify the requesting customer of the result of attempting to establish a connection with the called number in a variety of ways. For example, the ESP may not return a call back to the requesting customer at all if a desired connection is not established at the called party's number. Thus, not receiving a call back from the ESP may serve as a notification to the requesting customer that the desired connection was not established. However, not receiving a call back from the ESP may only serve to notify the requesting customer that the desired connection was not established, but may not notify the requesting customer of the actual result of the attempted connection. For example, suppose a requesting customer desires to have a call back only if a connection is established with a specific person. Not receiving a return call back may serve to notify the requesting customer that a connection with the desired person was not established. However, not receiving a return call back may not indicate to a requesting customer whether a connection was established at all, such as with an answering device or a different person.

Accordingly, in a preferred embodiment some type of return notification indicating the result of the attempted connection may be provided to the requesting customer. A customer may be able to request such return notification for only certain results. For example, the ESP may notify the requesting customer if no answer is received at the called party's number. In this alternative, the ESP may notify the requesting customer only if an answer is not received at all on the called party's number. As a further example, the ESP may notify the requesting customer only if an answering device answers the called party's number. As yet a further example, the ESP may notify the requesting customer only if a connection is established with a person other than the desired person.

In a preferred embodiment, the ESP may be implemented to provide such return notification to a requesting customer through a variety of methods of communication. For example, return notification may be provided to the customer via telephone. As another example, return notification may be provided to the customer's personal computer via data modem. As yet another example, return notification may be provided to the customer via a packet network, such as the Internet. Each of these methods of communicating a return notification to a customer is discussed in greater detail herein.

It should be appreciated that a technical advantage of one aspect of the present invention is realized in that a system and method for pre-qualifying Call Back service is provided. A further technical advantage of one aspect of the present invention is realized in that a system and method for administering Call Back service in which pre-qualification of such Call Back service is accomplished by first attempting to establish a connection with the called party's number before returning a call back to the requesting customer is provided.

A further technical advantage of one aspect of the present invention is realized in that a customer requesting Call Back service may avoid/reduce charges for attempting to make a connection with a called number. A further technical advantage of one aspect of the present invention is realized in that a system and method for pre-qualifying Call Back service wherein a return call back to the requesting customer is placed only after a connection is established with the called number. Accordingly, the requesting customer may not be charged for the time required for attempting to establish a connection with the called number, and the customer may not be charged if a connection is ultimately not established (e.g., there is no answer at the number called or there is a busy signal at the number called).

Yet a further technical advantage of one aspect of the present invention is realized in that a system and method for administering Call Back service may be provided wherein a call back to the requesting customer is placed only if a desired connection is established. For example, a call back to the requesting customer may be placed if any type of connection is established at the called number, only if a connection is established with a person, rather than an answering device, or only if a connection is established with a specific person at the called number. Accordingly, the requesting customer may not be charged if a desired type of connection is not established with the called party.

Yet a further technical advantage of one aspect of the present invention is realized in that a system and method is provided for pre-qualifying Call Back service wherein a customer requesting a Call Back service may be notified of the result of pre-qualifying Call Back service. Still a further technical advantage of one aspect of the present invention is realized in that a system and method is provided for pre-qualifying Call Back service wherein a customer requesting a Call Back service may be notified of the result of pre-qualifying Call Back service in an economical manner. Accordingly, a customer requesting Call Back service may have such Call Back service pre-qualified such that an attempt to establish a desired connection is first attempted before returning a call back to the requesting customer. Additionally, if the desired connection is not established, the requesting customer may be notified of the result of attempting to establish a connection at a called number in an economical manner.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 7 shows an exemplary transaction history that may be displayed on a web site or otherwise transmitted to a customer's computer to notify a customer of the result of pre-qualifying Call Back service.

DETAILED DESCRIPTION

Service providers currently offer Call Back service to customers to make long-distance calls from a country that imposes high call tariffs more affordable. The present invention may be better understood after a more detailed description of the prior art method for administering Call Back service.

Figure 1:
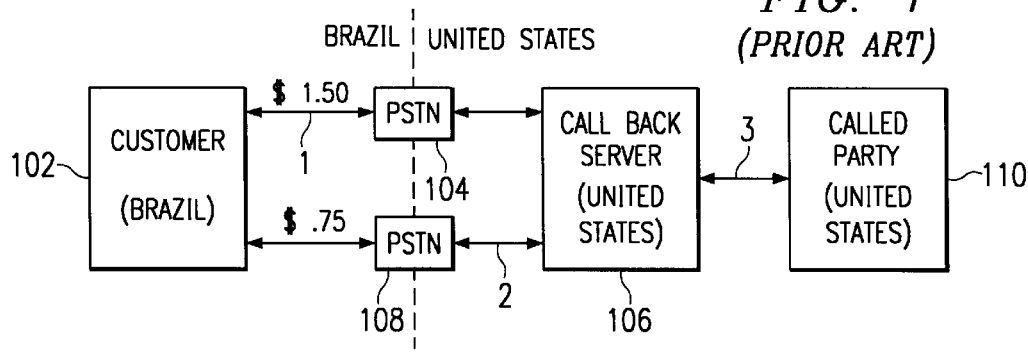
FIG. 1 shows in block diagram form an exemplary prior art method for administering Call Back service wherein pre-qualification is not provided.

Turning to FIG. 1, a prior art method for administering Call Back service is shown in block diagram form. Suppose for the purposes of explanation that a customer located in Brazil wants to call a party located in the United States. Suppose further that a call from Brazil to the United States costs $1.50 per minute due to the tariffs imposed by the Brazilian government. Also, suppose that a call from the United States to Brazil costs $0.75 per minute due to the lower tariffs imposed by the U.S. government. FIG. 1 illustrates the prior art method in which the Brazilian customer 102 would utilize Call Back service to call the Called Party 110 in the United States in a more affordable manner.

Customer 102 first places a telephone call to a call back server 106 located in the United States via a telephone utilizing a public switch telephone network ("PSTN"), as indicated in FIG. 1 by arrow 1. Typically, call back server 106 will play a recording that prompts customer 102 to enter the telephone number from which he is calling on the telephone keypad. Call back server 106 will recognize the dual tone multi-frequency ("DTMF") signals that are keyed from customer 102 then call back server 106 terminates its connection with customer 102 (i.e., hangs up).

Call back server 106 then places a return call back to customer 102 via telephone over PSTN 108, as indicated in FIG. 1 by arrow 2. Once a connection is established with customer 102 (i.e., customer 102 answers the call from call back server 106), customer 102 begins being charged at the lower calling rate of $0.75 per minute. Call back server 106 may then prompt customer 102 to enter the United States telephone number that customer 102 wants to call on the telephone keypad. Call back server 106 may recognize the DTMF signals that are keyed from customer 102 as the telephone number that customer 102 wants to call in the United States (e.g., the telephone number for called party 110). Call back server 106 then attempts to make a connection with the called party 110 by calling the desired number.

As the above-example of prior art Call Back service demonstrates, customer 102 begins being charged at the lower $0.75 calling rate before a connection is established with the called party 110. Customer 102 is charged at the $0.75 calling rate for the time required for the call back server 106 to attempt to establish a connection with the called party 110. Moreover, customer 102 is charged for the time required for attempting to make such a connection even if a connection is ultimately not made (e.g., there is no answer at the called number or there is a busy signal on the called number).

Thus, in some cases a customer requesting Call Back service may pay more utilizing the Call Back service than if the customer placed a direct call to the called party. For example, suppose a Brazilian customer 102 utilizes the prior art Call Back service to call called party 110 in the United States. Customer 102 first requests the Call Back service from call back server 106. Thereafter, call back server 106 places a return call back to customer 102, at which point customer 102 begins being charged the lower $0.75 calling rate. Call back server 106 then attempts to establish a connection with called party 110. Suppose that the call back server 106 obtains no answer or a busy signal at the called party's number. Customer 102 is charged the $0.75 rate for the time required for the call back server 106 to attempt to establish a connection with called party 110. However, if customer 102 would have placed a call directly to called party 110, customer 102 may not have incurred any charges for obtaining no answer or a busy signal. That is, customer 102 may only begin being charged the higher Brazilian rate on a direct call to called party 110 after a connection is established at the called party's number.

Figure 2:
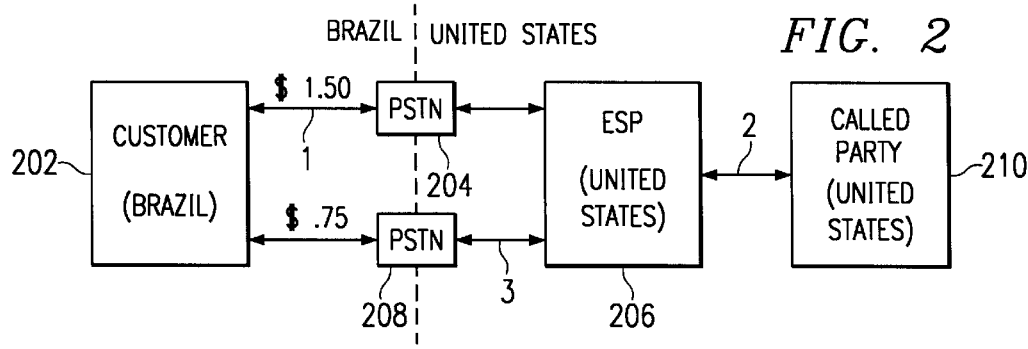
FIG. 2 shows in block diagram form an exemplary embodiment of the present invention for administering Call Back service wherein pre-qualification is provided.

Turning to FIG. 2, an overview of one embodiment of the invention disclosed herein is shown in block diagram form. Continuing with the above-example of a Brazilian customer wanting to call a party in the United States, the customer 202 may make a request for Call Back Service to an Enhanced Services Platform ("ESP") 206 via a telephone utilizing PSTN 204, as indicated in FIG. 2 by arrow 1. ESP 206 is a computer system that may provide enhanced telephony services for a service provider. More specifically, ESP 206 may be a computer system that comprises a memory storage device (e.g., hard disk, floppy disk, compact disc, tape, optical disk, or other type of data storage media) and a processor (e.g., a central processing unit). ESP 206 may contain computer executable code stored in such a memory storage device, and ESP 206 may execute such computer executable code to receive and process requests for Call Back service. Moreover, ESP 206 may have one or more telephony interfaces allowing it to attach to telephone lines. Typically, such telephony interface may be a T1 interface, although other telephony interfaces may be utilized as well.

ESP 206 may receive a telephone call from customer 202 through its telephony interface via PSTN 204. ESP 206 may prompt customer 202 to enter the telephone number from which he is calling on the telephone keypad or speak such number. ESP 206 may recognize the DTMF signals that are keyed from customer 202 utilizing a DTMF decoder, or ESP 206 may recognize a verbal response from customer 202 utilizing now known or later developed speech recognition techniques. Additionally, ESP 206 may prompt customer 202 to provide the number to be called by keying the number on the telephone keypad or by speaking such number. As with the customer's number, ESP 206 may recognize the DTMF signals that are keyed from customer 202 or the verbal response from customer 202 to receive the number to be called. Thereafter, ESP 206 may end its connection with customer 202 (i.e., hang up).

ESP 206 may also comprise a call generator for generating outbound telephone calls. After receiving a request for Call Back service from a customer 202, ESP 206 may attempt to establish a connection with the called party 201 by generating a call to the desired number, as indicated in FIG. 2 by arrow 2. If a connection is established with the called party 201, ESP 206 may notify called party 201 that a call will be connected to the customer 202. ESP 206 may then generate a return call back to customer 202 via telephone over PSTN 208, as indicated in FIG. 2 by arrow 3. Once a connection is established with customer 202 (i.e., customer 202 answers the return call from ESP 206), customer 202 may be connected with called party 210 and begin being charged at the lower calling rate of $0.75 per minute.

As the above example demonstrates, customer 202 may begin being charged at the lower $0.75 calling rate after a connection has been established with the called party 210. Thus, customer 202 may save the cost of being charged at the $0.75 calling rate during the time required for the ESP 206 to attempt to establish a connection with the called party 210.

Rather than utilizing an ESP as discussed above, any type of call back server, including call back servers of the prior art, may be implemented to operate as discussed above. That is, any type of call back server may be implemented to receive a request from a customer for Call Back service, then attempt to establish the desired connection with the called number, and then place a return call back to the requesting customer once a desired connection has been established at the called number. Additionally, it should be understood that a live operator, rather than a computer system, may be utilized to perform one or more of the described functions, such as receiving a request for Call Back service, attempting to establish the desired connection, and placing a return call back to the requesting customer. Any such implementation is intended to be within the scope of the present invention.

In a preferred embodiment, the ESP may place a return call back to the requesting customer in response to various types of connections being established at the called number. For example, the ESP may place a return call back to the requesting customer if any type of connection is established at the called number. As a further example, the ESP may place a return call back to the requesting customer only if a connection is established with a person (i.e., human being), rather than some type of answering device. As yet a further example, the ESP may place a call back to the requesting customer only if a connection is established with a specific person. A customer may specify a specific party that the customer desires to reach at the called number, and the ESP may then attempt to determine whether that specific party is available at the called number. For example, the ESP may prompt a party answering the called number to press "1" if they are the desired party or if the desired party is available at the number. Therefore, customer 202 is only charged the lower $0.75 per minute rate after a connection is established at the called number with a specific desired party available.

In a preferred embodiment, the requesting customer may specify which situation or situations the ESP is to return a call back to the customer. The customer may be presented the various options for triggering return call back to the customer, and the requesting customer may be able to choose one or more of the options that the customer desires to trigger such return call back. For example, such options may be presented to the customer at the time that the customer requests Call Back service. Moreover, the requesting customer may have a "profile" containing the customer's personal preferences, which the ESP may be able to access in providing pre-qualified Call Back service for the customer.

For example, a requesting customer may specify that the ESP is to return a call back to the customer if any type of connection is established at the called number, only if a person answers the called number, or only if a specific person is available at the called party's line. Most preferably, the requesting customer may be able to choose one or more of such situations. For example, a requesting customer may request that a return call back be placed only if a connection is established with a specific person or with an answering device. Various other situations exist which may trigger a return call back to the requesting customer. For example, receiving a message that the called number has changed or is no longer in operation may trigger a call back to the requesting customer. Many other situations may be available for triggering a return call back to the requesting customer, and any such situation is intended to be within the scope of the present invention. The present invention is not intended to be limited only to the situations for triggering a return call provided herein, rather such situations are intended as examples that render the disclosure enabling for many other situations for triggering a return call.

If a desired connection is established and a return call is placed to the called party, then the called party may be made aware of the successful connection upon receiving the return call. However, if the attempt to establish the desired connection is unsuccessful, the called party may desire to be notified of the result of such attempt to establish a connection. In a preferred embodiment, the ESP may notify the requesting customer of the result of attempting to establish a connection with the called number in a variety of ways. For example, the ESP may not return a call back to the requesting customer at all if a desired connection is not established at the called party's number. Thus, not receiving a call back from the ESP may serve as a notification to the requesting customer that the desired connection was not established (i.e., the attempt to establish the desired connection was unsuccessful).

However, not receiving a call back from the ESP may only serve to notify the requesting customer that the desired connection was not established, but may not notify the requesting customer of the actual result of the attempted connection. For example, suppose a requesting customer desires to have a call back only if a connection is established with a specific person. Not receiving a return call back may serve to notify the requesting customer that a connection with the desired person was not established. However, not receiving a return call back may not indicate to a requesting customer whether a connection was established at all, such as with an answering device or a different person. Moreover, not receiving a return call back may not indicate to a requesting customer whether no answer was obtained at the called number, whether the line was busy, or whether the called number was an invalid number (e.g., a number that is not in service).

Accordingly, in a preferred embodiment some type of return notification indicating the result of the attempted connection may be provided to the requesting customer. The ESP may provide such return notification for various results obtained. For example, the ESP may notify the requesting customer if no answer is received at the called party's number. As a further example, the ESP may notify the requesting customer desiring a connection with a person if an answering device answers the called party's number. As yet a further example, the ESP may notify the requesting customer if a connection is established with a person other than a desired person. Various other results may be obtained when attempting to establish a connection with a called number, and any such result is intended to be within the scope of the present invention. The present invention is not intended to be limited only to the results described herein, rather such results are intended as examples that render the disclosure enabling for many other results of attempting to establish a connection with a called number. It is also within the scope of the present invention to notify a requesting customer of any type of result that may be obtained, and the present invention is not intended to be limited to notifying the customer of the types of results described herein.

In a preferred embodiment, the requesting customer may specify the type of results for which a return notification is desired. For example, a customer requesting pre-qualified Call Back service wherein a return call is to be made to such customer only if a specific person is available may specify that return notification is desired only if a person answers the call and indicates that the desired person is not available. Thus, the customer may not receive return notification if no answer is obtained or if an answering device answers the call. More specifically, a requesting customer may be presented the various options for triggering return notification, and the requesting customer may be able to choose one or more of the options that the customer desires to trigger such return notification. For example, such options may be presented to the customer at the time that the customer requests Call Back service. Moreover, the requesting customer may have a "profile" containing the customer's personal preferences, which the ESP may be able to access in providing pre-qualified Call Back service for the customer. In alternative embodiments, a requesting customer may be notified of all types of results, or only certain types of results, without the requesting customer having the ability to tailor the situations in which return notification is to be provided.

Such return notification may be provided to the requesting customer in a number of ways. In a preferred embodiment, the ESP may be implemented to provide such return notification to a requesting customer through a variety of methods of communication. For example, return notification may be provided to the customer via telephone. As another example, return notification may be provided to the customer's personal computer via data modem. As yet another example, return notification may be provided to the customer via a packet network, such as the Internet. Exemplary implementations utilizing such methods of communicating a return notification to a customer are discussed in greater detail hereafter.

Focusing again on FIG. 2, return notification may be provided to customer 202 via telephone at the lower $0.75 rate. For example, ESP 206 may generate a return telephone call to customer 202 at the lower $0.75 rate to provide such notification. Receiving a return notification at the lower $0.75 rate may be less expensive for customer 202 than being charged the $0.75 for the time required for attempting to establish a connection with called party 210. For example, a short statement explaining the result of attempting to establish a connection may be a shorter call, and in turn less expensive, than the time required for attempting to establish a connection with the called number. Additionally, a recording of the connection may be provided, such as a recording of the called party's answering machine, or a recording of a party answering and indicating that the desired party is not available, or a recording of a notice that the number has changed or is invalid (so that if a new number is provided the requesting customer may be provided such number).

Such a recording may provide customer 202 with specific information obtained when attempting to establish a call. The recording may provide valuable information to customer 202. For example, the recording may contain a message from the operator that the telephone number has changed, or it may contain a message from the called party's answering device stating when or where the called party may be reached. In one embodiment of the present invention, the return notification may notify the customer of the result and present the customer with the option to hear a recording of the call. For example, the notification may inform the customer that "an answering device was reached when attempting to connect the call." The notification may also present the customer with an option to hear a recording of the call, such as "press 1 to hear a recording of the attempted call." If the customer wants to hear a recording of the answering machine message, the customer may choose such option. Otherwise, the customer may terminate the call more quickly, and thus more economically, after receiving the initial message.

In co-pending U.S. application Ser. No. entitled "ADMINISTERING CALL BACK SERVICES," a system and method which administer Call Back service by utilizing the Internet or other packet network to receive customer requests for Call Back service is disclosed. Such Internet or other packet network may be further utilized to provide return notification to a requesting customer in an economical manner. The Internet or other packet network may be utilized to provide return notification to a requesting customer, even if such network is not utilized in receiving a request for Call Back service from the customer.

Figure 3:
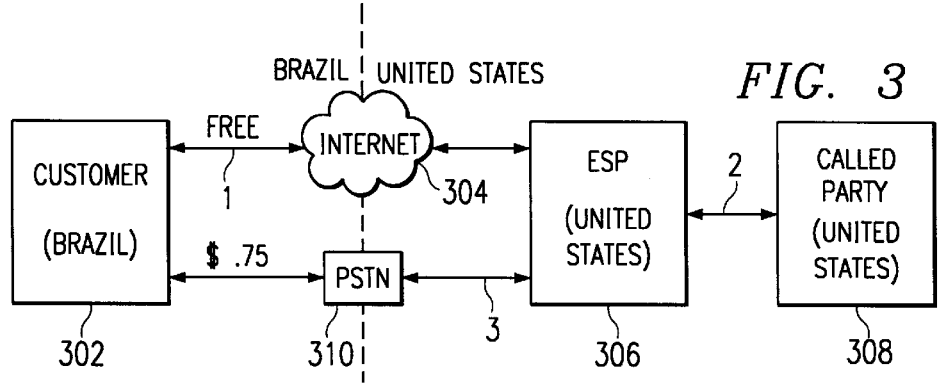
FIG. 3 shows in block diagram form a preferred embodiment of the present invention for pre-qualifying Call Back service wherein notification of the result of an attempted connection with a called party may be provided to a requesting customer via a packet network.

Turning to FIG. 3 an exemplary embodiment is illustrated wherein Internet 304, or some other packet network, may be utilized for communication between customer 302 and ESP 306. In such an embodiment, ESP 306 has one or more connections to a packet network, such as Internet 304. In a preferred embodiment, customer 302 may request a Call Back service via Internet 304 as disclosed in co-pending U.S. application Ser. No. entitled "ADMINISTERING CALL BACK SERVICES." Moreover, regardless of the method used by customer 302 to request a Call Back service, in a preferred embodiment ESP 306 may utilize Internet 304 to communicate return notification of the result of attempting to establish a connection with called party 308 to customer 302.

Figure 4:
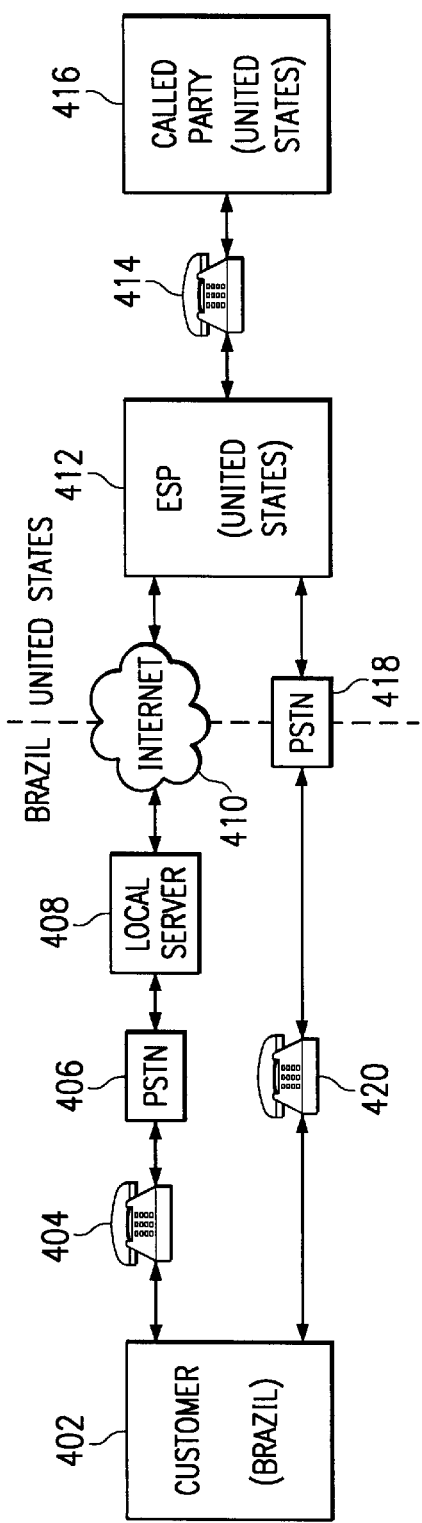
FIG. 4 shows in block diagram form one embodiment of the present invention for pre-qualifying Call Back service.

Turning now to FIG. 4, one exemplary embodiment of the present invention is illustrated. In this embodiment, a customer 402 may have access to a telephone 404 but may not have access to a personal computer. As shown, ESP 412 may still utilize the Internet 410 to communicate return notification to customer 402. For example, customer 402 may request Call Back service from ESP 412. As disclosed in co-pending U.S. application Ser. No. entitled "ADMINISTERING CALL BACK SERVICES," customer 402 may place such a request using telephone 404 to call local server 408 over PSTN 406. Local server 408 may receive information from customer 402, such as the telephone number from which customer 402 is calling and the telephone number which customer 402 desires to call. Local server 408 may also receive other information from customer 402, such as the type of connection desired and the type of notification desired. Once local server 408 obtains information from customer 402, local server 408 may transfer the information to ESP 412 via Internet 410. ESP 412 may receive the information and attempt to provide Call Back service for customer 402.

Regardless of the method used to receive a request for Call Back service, once a request for Call Back service is received ESP 412 may attempt to establish a connection with the called party 416. If the desired connection is established, ESP 412 may connect called party 416 with customer 402 via PSTN 418. However, if the desired connection is not established, ESP 412 may notify customer 402 of such result via Internet 410. That is, ESP 412 may communicate such result to local server 408 via Internet 410. Thereafter, local server 408 may call customer 402 via PSTN 406 and provide the result to customer 402. It should be understood, that this method of communicating return notification to customer 402 may be utilized regardless of the method used to communicate a request for Call Back service to ESP 412. For example, if customer 402 called ESP 412 directly to request Call Back service, ESP 412 may still utilize the above-described method to pre-qualify the Call Back service and communicate return notification to customer 402.

Local server 408 may be located within the same country as customer 402, and the telephone call from local server 408 to customer 402 to provide notification may be a local telephone call or a long-distance telephone call. This embodiment allows a customer with access to a telephone to receive notification of the result of pre-qualifying a Call Back service at little or no cost to the customer. That is, because the telephone call from local server 408 to customer 402 may be a local telephone call, customer 402 may incur no additional cost for receiving such a call. Moreover, even if the telephone call from local server 408 to customer 402 is a long-distance telephone call within the customer's country and assuming that the long-distance charges may be passed on to customer 402, such a long-distance call may still be less expensive than receiving a notification call directly from ESP 412 in the United States or being charged during the time required for ESP 412 attempting to establish a connection with the called party 416. Furthermore, the transfer of information from ESP 412 to local server 408 may be free. Thus, customer 402 may receive notification of the result of pre-qualified Call Back service in an economical manner.

Figure 5:
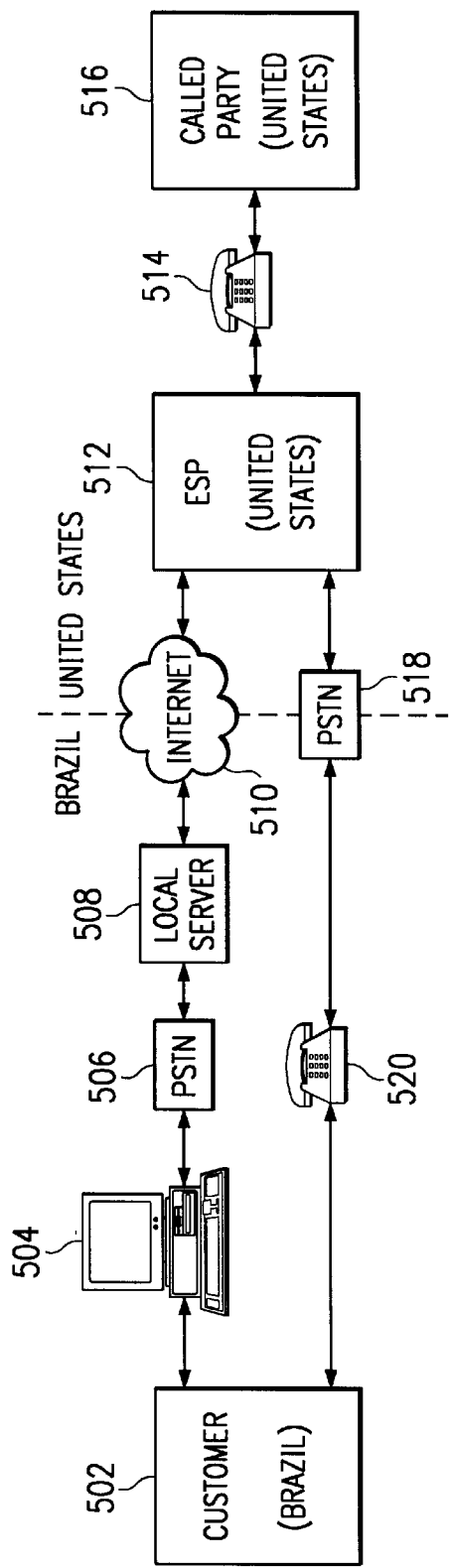
FIG. 5 shows in block diagram form an alternative embodiment of the present invention for pre-qualifying Call Back service.

Turning to FIG. 5, an alternative exemplary embodiment of the present invention is shown. With this alternative embodiment, customer 502 may have access to personal computer (PC) 504 with a data modem, but may not have the ability to access the Internet (e.g., has a PC without Internet Service). As shown, ESP 512 may utilize the Internet 510 to communicate return notification to customer 502. PC 504 may be executing a software program for requesting Call Back service and/or receiving notification of results of pre-qualifying Call Back service. For example, customer 502 may request Call Back service from ESP 512. As disclosed in co-pending U.S. application Ser. No. entitled "ADMINISTERING CALL BACK SERVICES," customer 502 may place such a request utilizing a software program executing on PC 504. More specifically, a software program may be executing on PC 504 to receive input information for a Call Back service request from customer 502 and transmit such information to local server 508 via data modem over PSTN 506. Once local server 508 receives such information, local server 508 may transfer the information to ESP 512 via Internet 510. ESP 512 may receive the information and attempt to provide Call Back service for customer 502.

Once a request for Call Back service is received by ESP 512, ESP 512 may attempt to establish a connection with the called party 516. If the desired connection is established, ESP 512 may connect called party 516 with customer 502 via PSTN 518. However, if the desired connection is not established, ESP 512 may notify customer 502 of such result via Internet 510. That is, ESP 512 may communicate such result to local server 508 via Internet 510. Thereafter, local server 508 may communicate such result to PC 504 via PSTN 506. Software executing on PC 504 may receive the result from local server 508 and provide such notification to customer 502.

It should be understood, that this method of communicating return notification to customer 502 may be utilized regardless of the method used to communicate a request for Call Back service to ESP 512. That is, even if a customer uses a different method to request Call Back service than the one described above, this method may still be utilized to provide notification of results to a customer. For example, if customer 502 called ESP 512 directly via telephone to request Call Back service, ESP 512 may still utilize the above-described method to pre-qualify the Call Back service and communicate return notification to customer 502. For example, a "profile" containing the requesting customer's preferences may be accessed by the ESP 512 when providing Call Back services. From such profile, ESP 512 may determine that the requesting customer 502 prefers to receive notification on PC 504 as described above.

Local server 508 may be located within the same country as customer 502, and the data modem call from local server 508 to customer 502 to provide notification may be a local call or a long-distance call. This embodiment allows a customer with access to a PC with a data modem to receive notification of the result of pre-qualifying a Call Back service at little or no cost to the customer. That is, because the data modem call from local server 508 to customer 502 may be a local call, customer 502 may incur no additional cost for receiving such notification. Moreover, even if the data modem call from local server 508 to customer 502 is a long-distance call within the customer's country and assuming that the long-distance charges may be passed on to customer 502, such a long-distance call may still be less expensive for customer 502 than receiving a notification call directly from ESP 512 in the United States or being charged during the time required for ESP 512 attempting to establish a connection with the called party 516. Furthermore, the transfer of information from ESP 512 to local server 508 via Internet 510 may be free. Thus, customer 502 may receive notification of the result of pre-qualified Call Back service in an economical manner.

Figure 6:
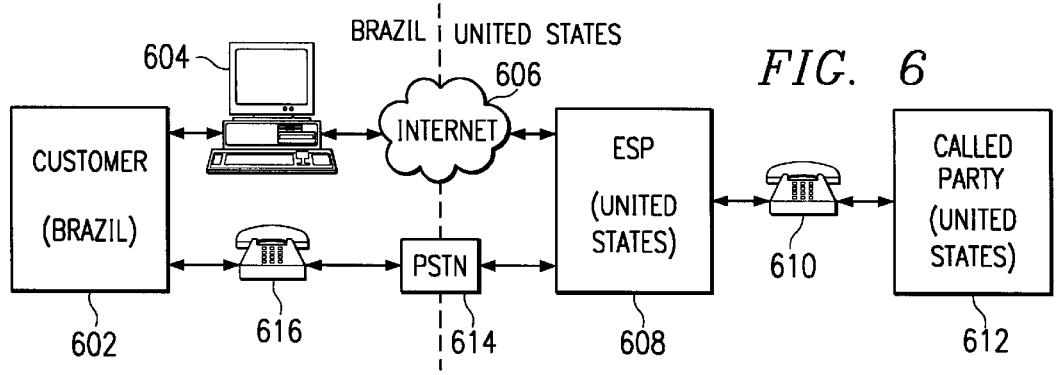
FIG. 6 shows in block diagram form another alternative embodiment of the present invention for pre-qualifying Call Back service.

Turning to FIG. 6, another alternative exemplary embodiment of the present invention is shown. With this alternative embodiment, customer 602 may have access to PC 604 with the ability to access the Internet (e.g., has a PC with Internet service). As shown, ESP 608 may utilize the Internet 606 to communicate return notification to customer 602. For example, customer 602 may request Call Back service from ESP 608. As disclosed in co-pending U.S. application Ser. No. entitled "ADMINISTERING CALL BACK SERVICES," customer 602 may use computer 604 to submit a request for Call Back service to ESP 608 via Internet 606. Once such a request is submitted to ESP 608, ESP 608, may attempt to provide Call Back service for customer 602.

After receiving a request for Call Back service, ESP 608 may attempt to establish a connection with the called party 612. If the desired connection is established, ESP 608 may connect called party 612 with customer 602 via PSTN 614. However, if the desired connection is not established, ESP 608 may notify customer 602 of such result via Internet 606. There are various embodiments that may be implemented to allow ESP 608 to communicate such notification to customer 602, some of which will be discussed in greater detail hereafter.

In one embodiment of the present invention, a service provider may have a web site. That is, a service provider may maintain a web site that customers may access via the Internet 606. More specifically, a web server (or "web host") may deliver or "serve up" web pages for the service provider's web site when the web server's Uniform Resource Locator ("URL") is accessed. Such a web site may allow customer 602 to receive a return notification regarding results of pre-qualifying Call Back service from ESP 608 via Internet 606. For example, customer 602 may access the service provider's web site via the Internet 606. The service provider's web site may allow customer 602 to submit a request for Call Back service, as disclosed in co-pending U.S. application Ser. No. entitled "ADMINISTERING CALL BACK SERVICES." As with the previous embodiment, it should be understood that regardless of whether a request for Call Back service is received from customer 602 via the web site, the web site may provide customer 602 a method for receiving return notification information about the results of pre-qualifying Call Back service.

For example, customer 602 may access the service provider's web site and view such return notification information that ESP 608 posts on the web site. The web site may require customer 602 to supply some type of information identifying a particular Call Back service request, such as a transaction number for a particular requested Call Back service. The web site may require customer 602 to supply some type of identification information, such as a Personal Identification Number (PIN). An example of information that may be provided on such a web site is illustrated in FIG. 7. FIG. 7 displays a history of Call Back service requests for "Joe Customer." The web site may require that Joe Customer provide a PIN or other identification prior to viewing such a history.

As the first transaction shown in FIG. 7 illustrates, Joe Customer requested Call Back service for a call to telephone number (555) 555-1111 at 1:30 PM on May 1, 1999. As the result indicates, in trying to establish a connection at the called number the ESP obtained no answer at 1:35 PM on May 1, 1999. In the second displayed transaction, Joe Customer requested Call Back service for a call to telephone number (555) 555-2222 at 3:20 PM on May 2, 1999. The displayed result notifies Joe Customer that the line was busy when attempting to establish a connection at 3:28 PM on May 2, 1999. As the third transaction illustrates, Joe Customer requested Call Back service for a call to telephone number (555) 555-3333 at 10:30 AM on May 3, 1999. The displayed result indicates that in attempting to establish a connection with the called number, the ESP received a message that the number is no longer in operation.

Transaction 4 shown in FIG. 7 displays a result obtained for a request for Call Back service to telephone number (555) 555-4444, in which Joe Customer requested no return call if a connection is established with an answering device. As the result in transaction 4 indicates, the ESP established a connection with an answering device at 5:07 PM on May 4, 1999. Transaction 5 illustrates that Joe Customer requested a Call Back service at 5:30 PM on May 4, 1999. The displayed result notifies Joe Customer that a person specified by Joe Customer was not available. In alternative embodiments, additional information may be included within each transaction listing for the requests, such as more detailed information about the types of situations specified by Joe Customer to trigger a return call for each request. For example, information may be included in transaction 4 indicating that Joe Customer requested a return call if a connection was established at the called number, unless the connection was established with an answering device. As another example, information may be included in transaction 5 indicating that Joe Customer requested a return call only if a specific person was available.

As discussed above, the ESP 608 may record the call placed to the called number in attempting to establish a desired connection. For example, the ESP 608 may record the answering device message or a message provided by an operator. Such recording may be available to customer 602 via the web site. Additionally, such recording may be available to customer 602 in the previous embodiment discussed in conjunction with FIG. 5 via PC 504. The recording may be presented as a sound file (e.g., .wav file). Moreover, the recording may be converted to text and presented on web site 602 or otherwise transmitted to the customer's PC (e.g., via the method discussed in conjunction with FIG. 5). In one embodiment, a speech-to-text converter may be utilized to convert the recording to text. In alternative embodiments, a live operator may transcribe the recording to text.

In a preferred embodiment, ESP 608 may update the results posted on the web site in real-time. Thus, customer 602 may receive notification of a result shortly after the ESP 608 obtains such result. Thus, this web site embodiment allows a customer with access to a computer having Internet access to receive notification of results of pre-qualifying Call Back service at little or no cost to the customer. That is, because the customer 602 may access the service provider's web site and receive such notification of results of pre-qualifying Call Back service via the web site free of charge, the customer 602 may avoid costs associated with the ESP calling the customer to provide such notification.

Another embodiment wherein a customer requesting Call Back services has access to a computer 604 with Internet access may also be illustrated with FIG. 6. In such an embodiment customer 602 may receive notification of results of pre-qualifying a Call Back service from ESP 608 by receiving an electronic mail (email) message from ESP 608 via the Internet 606. The received email may contain similar information for a requested pre-qualified Call Back service as shown and described in conjunction with FIG. 7. Thus, this embodiment also allows a customer with access to a computer with Internet service to receive notification of results of pre-qualifying Call Back service at little or no cost to the customer. That is, because the email message from ESP 608 may be free, customer 602 may avoid costs associated with the ESP calling the customer to provide such notification.

As described herein, a customer's profile may be utilized by the ESP in providing pre-qualified Call Back service. Such a profile may be a file contained in a database accessible by the ESP, or it may be some other type of file stored in a memory storage device accessible by the ESP. Most preferably, the customer may update/change information in the profile by submitting such updates/changes via telephone, via a PC using a data modem, or via a PC using the Internet or other packet network.

For ease of explanation, the FIGS. and accompanying narratives herein describe embodiments of the present invention using an example wherein a customer located in Brazil desires a pre-qualified Call Back service to call a party located in the United States. It should be understood that such FIGS. and narratives merely provide examples, and both a customer requesting pre-qualified Call Back service and the party that the customer desires to call may be located in any countries and still be within the scope of the present invention. In general, the two parties may be in any locations where the cost of calling from the customer to the called party is more than the cost of calling from the called party to the customer.

It should also be understood that various other features for Call Back service may be implemented in the disclosed system and method for pre-qualifying Call Back service, and such implementations are intended to be within the scope of the present invention. As an example, a customer may specify that the ESP repeatedly attempt to obtain the desired connection during a specified time period. For example, a customer may specify that the ESP attempt to obtain a connection with the called number between 1:00 PM and 5:00 PM on May 4, 1999. Thereafter, the ESP may repeatedly attempt to establish a connection at the called number during the specified time period by calling the number periodically (e.g., every 10 minutes).

The embodiments have been described herein as allowing for a customer to pre-qualify a Call Back service and receive notification of results of such pre-qualification in an economical manner, such as "free" of cost. As used herein, the term "free" means that a customer has "no cost" or "no incremental cost" in requesting a Call Back service. Thus, fixed costs may be involved, such as a fixed cost that a customer has for Internet service, but because a customer may pre-qualify a Call Back service at no additional cost, such a request may still be considered "free." It should be understood that a customer may utilize the method and system disclosed herein to pre-qualify a Call Back service at no additional cost.

It should also be understood that the service provider or other party may charge the customer an additional cost to pre-qualify a Call Back service and still be within the scope of the present invention. For example, a service provider that maintains a web site that allows a customer to request a pre-qualified Call Back service may charge the customer an additional fee for placing a request for such a pre-qualified Call Back service via the Internet web site. Additionally, the service provider may charge the customer an additional fee to receive notification of the results attempting to establish a desired connection with a called number. As long as such additional fee is less expensive than traditional methods of being charged at the lower country's rate while the call back server attempts to establish a call with the called number, the customer may choose to pay the less expensive fee and utilize an embodiment of the inventive system and method for pre-qualifying Call Back service. Such additional fees may be associated with the method and system for pre-qualifying Call Back service disclosed herein and still be within the scope of the present invention.

Although the system and method for requesting Call Back service disclosed in co-pending U.S. application Ser. No. entitled "ADMINISTERING CALL BACK SERVICES" has been incorporated and utilized in many examples herein, it should be understood that the disclosed method and system for pre-qualifying Call Back services may be implemented with any method and system for requesting Call Back service. Thus, the embodiments disclosed herein for pre-qualifying Call Back services and notifying a customer of the result of such pre-qualification are not limited to requests made for Call Back service as disclosed in co-pending U.S. application Ser. No. entitled "ADMINISTERING CALL BACK SERVICES," but may be implemented with any method for requesting Call Back service.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for administering Call Back service, the method comprising:
   receiving a request from a customer for said Call Back service at an enhanced services platform that provides Call Back service, wherein said request includes a particular connection from a plurality of connection types said customer desires; and
   upon receiving said request, pre-qualifying said Call Back service wherein said enhanced services platform first calls a telephone number to which said customer desires a connection and said enhanced service platform calling said customer via telephone to connect said customer to said telephone number only if said enhanced services platform has first established said particular connection at said telephone number.

2. The method of claim 1, wherein said plurality of connection types includes a connection at said telephone number.

3. The method of claim 1, wherein said plurality of connection types includes a connection with a person, rather than an answering device.

4. The method of claim 1, wherein said plurality of connection types includes a connection with a specified person.

5. The method of claim 1, further comprising:
   providing notification to said customer of a result of performing said pre-qualifying based on a selected method of notification chosen from a set of methods of notification.

6. The method of claim 5, wherein said set of methods of notification includes a switched packet network.

7. The method of claim 6, wherein said switched packet network is the Internet.

8. The method of claim 5, wherein said set of methods of notification includes a web site.

9. The method of claim 5, wherein said set of methods of notification includes email.

10. The method of claim 5, wherein said set of methods of notification includes telephone.

11. A method for pre-qualifying Call Back service, the method comprising:
    receiving a request for Call Back service, wherein said request includes a particular method of notification selected from a set of methods of notification;
    upon receiving said request, first attempting to establish a desired connection at a telephone number to which a customer desires a connection and calling said customer via telephone to connect said customer to said telephone number only if said desired connection has first been established at said telephone number; and
    notification of the attempt result via the selected particular method of notification if the desired connection is not established.

12. The method of claim 11, wherein said desired telephone connection is a connection selected from the group consisting of:
    any type of connection at said telephone number, a connection with a person rather than a connection with an answering device, and a connection with a specified person.

13. The method of claim 11, further comprising:
    receiving the type desired connection from a customer.

14. The method of claim 11, wherein said result is communicated if said desired connection is not established.

15. The method of claim 11, wherein said result is a result selected from the group consisting of:
    no answer at telephone number, line busy at telephone number, telephone number is invalid, connection with an answering device at telephone number, and desired person not available.

16. The method of claim 11, wherein said set of methods of notification includes a switched packet network.

17. The method of claim 16, wherein said switched packet network is the Internet.

18. The method of claim 11, wherein said set of methods of notification includes a web site.

19. The method of claim 11, wherein said set of methods of notification includes email.

20. The method of claim 11, wherein said set of methods of notification includes telephone.

21. A programmed computer for pre-qualifying Call Back service, comprising:
    a storage device for storing computer executable program code;
    a processor for executing said program code stored in said storage device;
    means for receiving a request for Call Back service, wherein said request includes a particular connection selected from a plurality of connection types desired by a customer;
    means for first attempting to establish the requested connection to which a customer requesting said Call Back service desires said connection upon receiving a request for Call Back service; and
    means for calling a customer requesting said Call Back service via telephone to connect said customer to said specified telephone number only if said enhanced services platform has first established a desired telephone connection at said telephone number.

22. The programmed computer of claim 21, wherein said means for attempting to establish a desired connection at a telephone number comprises a call generator for generating a telephone call.

23. The programmed computer of claim 22, wherein said means for attempting to establish a desired connection at a telephone number further comprises program code for determining whether a desired connection has been established.

24. The programmed computer of claim 21, wherein said means for calling a customer requesting said Call Back service is a call generator for generating a telephone call.

25. The programmed computer of claim 21, wherein said plurality of connections consists of:
    any type of connection at said telephone number, a connection with a person rather than a connection with an answering device, and a connection with a specified person.

26. The programmed computer of claim 21, further comprising:
    means for notifying said customer of the result of attempting to establish a desired connection at said telephone number via a method of notification selected from a set of methods of notification.

27. The programmed computer of claim 26, wherein said result is a result selected from the group consisting of:
    no answer at telephone number, line busy at telephone number, telephone number is invalid, connection with an answering device at telephone number, and desired person not available.

28. The programmed computer of claim 26, wherein said set of methods of notification includes telephone.

29. The programmed computer of claim 26 wherein said set of methods of notification includes a packet network.

30. The programmed computer of claim 29, wherein said set of methods of notification includes a web site and electronic mail.

* * * * *